United States Patent [19]
Lee et al.

[11] Patent Number: 5,351,077
[45] Date of Patent: Sep. 27, 1994

[54] MICROWAVE AIRCRAFT LANDING SYSTEM USING NARROW BANDWIDTH FILTERING

[75] Inventors: Paul S. C. Lee, La Palma; Jay S. Pearlman, Rancho Palos Verdes, both of Calif.

[73] Assignee: TRW Inc., Redondo Beach, Calif.

[21] Appl. No.: 963,338

[22] Filed: Oct. 19, 1992

[51] Int. Cl.[5] .......................... H04N 7/18; G01S 1/16
[52] U.S. Cl. ................................. 348/117; 348/116; 348/163; 340/947; 342/35
[58] Field of Search ........................ 358/110, 103, 109; 340/933, 947, 958; 73/178 T; 342/34, 33, 411, 412, 35; 348/113, 116, 117, 122, 123, 163

[56] References Cited

U.S. PATENT DOCUMENTS

| | | | |
|---|---|---|---|
| 3,968,495 | 7/1976 | Hergenrother | 342/410 |
| 4,101,893 | 7/1978 | Lewis | 342/411 |
| 4,196,346 | 4/1980 | McElhannon | 340/951 |
| 4,210,930 | 7/1980 | Henry | 358/103 |
| 4,727,343 | 2/1988 | Stone . | |
| 4,740,779 | 4/1988 | Cleary et al. | 340/705 |
| 4,901,084 | 2/1990 | Huguenin et al. . | |
| 4,910,523 | 3/1990 | Huguenin et al. . | |
| 4,940,986 | 7/1990 | Huguenin | 342/410 |
| 5,043,726 | 8/1991 | Shifrin | 342/33 |
| 5,047,783 | 9/1991 | Hugenin . | |
| 5,206,660 | 4/1993 | Cochrane et al. | 346/76 PH |
| 5,218,360 | 6/1993 | Goetz et al. | 342/407 |

Primary Examiner—Tommy P. Chin
Assistant Examiner—Bryan S. Tung

[57] ABSTRACT

A microwave locating system is provided for locating known features and distinguishing between different types of features. The locating system includes a plurality of modulated microwave power sources located on known features and radiating modulated microwave signals having modulated frequencies selected in accordance with the known features. A video detection sensor camera is located remote from the sources for sensing microwave signals within a field of view and providing location signals for each of the sources. The camera includes an array of receiver elements which provide narrow bandwidth filtering so as to identify received signals as one of a plurality of selected modulated frequencies. The locating system further provides an image of the location signals which distinguishes between different selected located features.

19 Claims, 4 Drawing Sheets

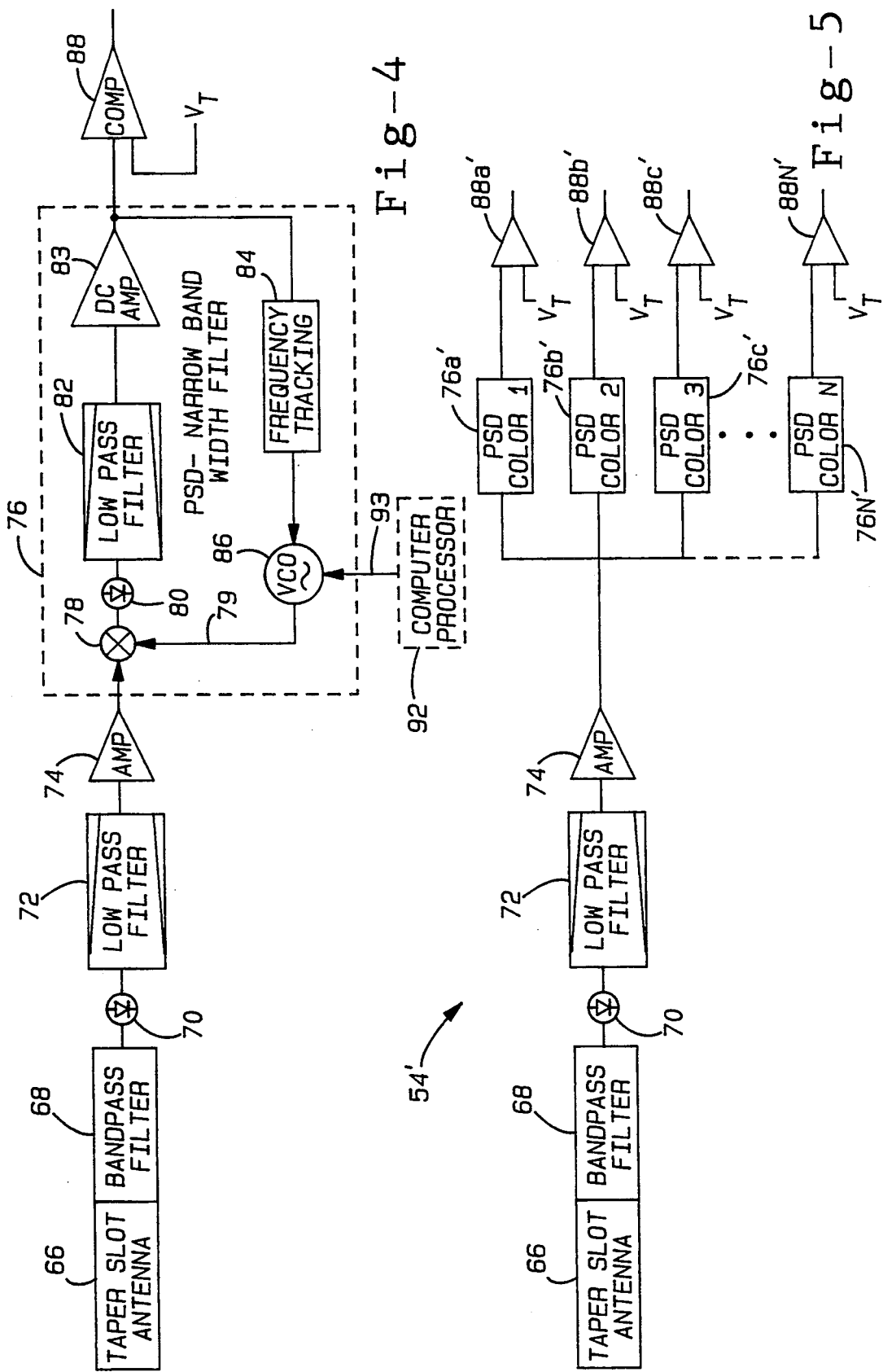

MICROWAVE AIRCRAFT LANDING SYSTEM USING NARROW BANDWIDTH FILTERING

BACKGROUND OF THE INVENTION

1. Technical Field

The present invention relates generally to locating systems and, more particularly, to a microwave or millimeter wave locating system for locating known features such as an airport runway and various features associated therewith, especially under conditions of low visibility.

2. Discussion

There exist a number of aircraft landing systems for guiding an aircraft to a safe landing when approaching a runway under conditions of low visibility. One known approach employs a ground controlled system which has a radar system with scanning antennas located near the runway. A ground operator is generally required to instruct the pilot of the aircraft of his position so that the pilot may adjust the position of the aircraft on approach of the desired landing path. Another approach is the instrument landing system (ILS) which employs antennas located near the runway which radiate a localization beam to provide left-right and up-down control guidance signals to a receiver in the aircraft. The receiver converts the guidance signals into meter pointer deflection signals which provide a pointer deflection for the pilot to fly the aircraft on the desired landing path. While these approaches have worked well, both have limited landing guidance capabilities. For instance, these approaches generally provide only one acceptable landing approach path and limited location information to the pilot.

More recently, microwave landing systems have been deployed for providing landing paths for an aircraft under conditions of low visibility. Conventional microwave landing systems generally employ a number of antennas located near the runway which scan the aircraft's approach region. Microwave receiving equipment is located on the aircraft which receives and decodes the scanning information and converts it to a display. However, the conventional microwave landing system typically provides a display which is significantly different from what the pilot would actually see. As a result, the conventional microwave landing system provides an image on a screen of the runway which the pilot relies on to guide the aircraft to the point where the runway becomes visible. At that point, the pilot typically relies on what he can see as the features that make up the conditions for landing and more easily manually land the aircraft visually.

Another approach is disclosed in U.S. Pat. No. 4,940,986 entitled "Millimeter Wave Locating" which discloses a number of millimeter wave sources located near runway light housings for radiating millimeter wave beams along the runway. An airborne millimeter wave camera is provided for receiving the signals and creating an image of the millimeter wave sources which corresponds substantially to a visible image perceived by a landing pilot. While this approach may provide the location of the runway, it generally does not provide narrow band receivers for sensing modulated signals which enable a pilot to more accurately locate other features and distinguish between such features. For instance, it is desirable for a pilot to accurately identify other ground and air features for purposes of crash avoidance. In addition, this approach does not allow a pilot to accurately distinguish between different types of features located on or near the runway.

It is therefore desirable to provide for a microwave or millimeter wave locating system which enables an operator to locate known features such as a runway and other selected features which may commonly be found on or near the runway. In addition, it is further desirable to provide for such a locating system which enables an operator to accurately distinguish between different types of located features. Furthermore, it is desirable to provide for narrow band detection of modulated signals so as to detect the location of the sources emitting the modulated signals.

SUMMARY OF THE INVENTION

In accordance with the teachings of the present invention, a microwave/millimeter wave locating system is provided for remotely sensing the location of known features and distinguishing between different selected features. The locating system includes a plurality of modulated microwave power sources located on known features and radiating modulated microwave or millimeter wave signals having modulated frequencies selected to identify selected known features. A video detection sensor camera is located remote from the power sources for sensing microwave signals within a field of view and providing location signals for each of the sources. The camera has an array of receiver elements which provide narrow bandwidth filtering so as to identify the received signal as one of a plurality of selected modulated frequencies. The locating system further provides an image of the location signals which distinguishes between different selected located features.

BRIEF DESCRIPTION OF THE DRAWINGS

Other objects and advantages of the present invention will become apparent to those skilled in the art upon reading the following detailed description and upon reference to the drawings in which:

FIG. 4 is a block diagram which illustrates one receiver element of a focal plane array in accordance with the preferred embodiment of the present invention;

FIG. 5 is a block diagram which illustrates one receiver element of a focal plane array in accordance with an alternate embodiment of the present invention.

DETAILED DESCRIPTION OF THE PREFERRED EMBODIMENT

Figure 1:
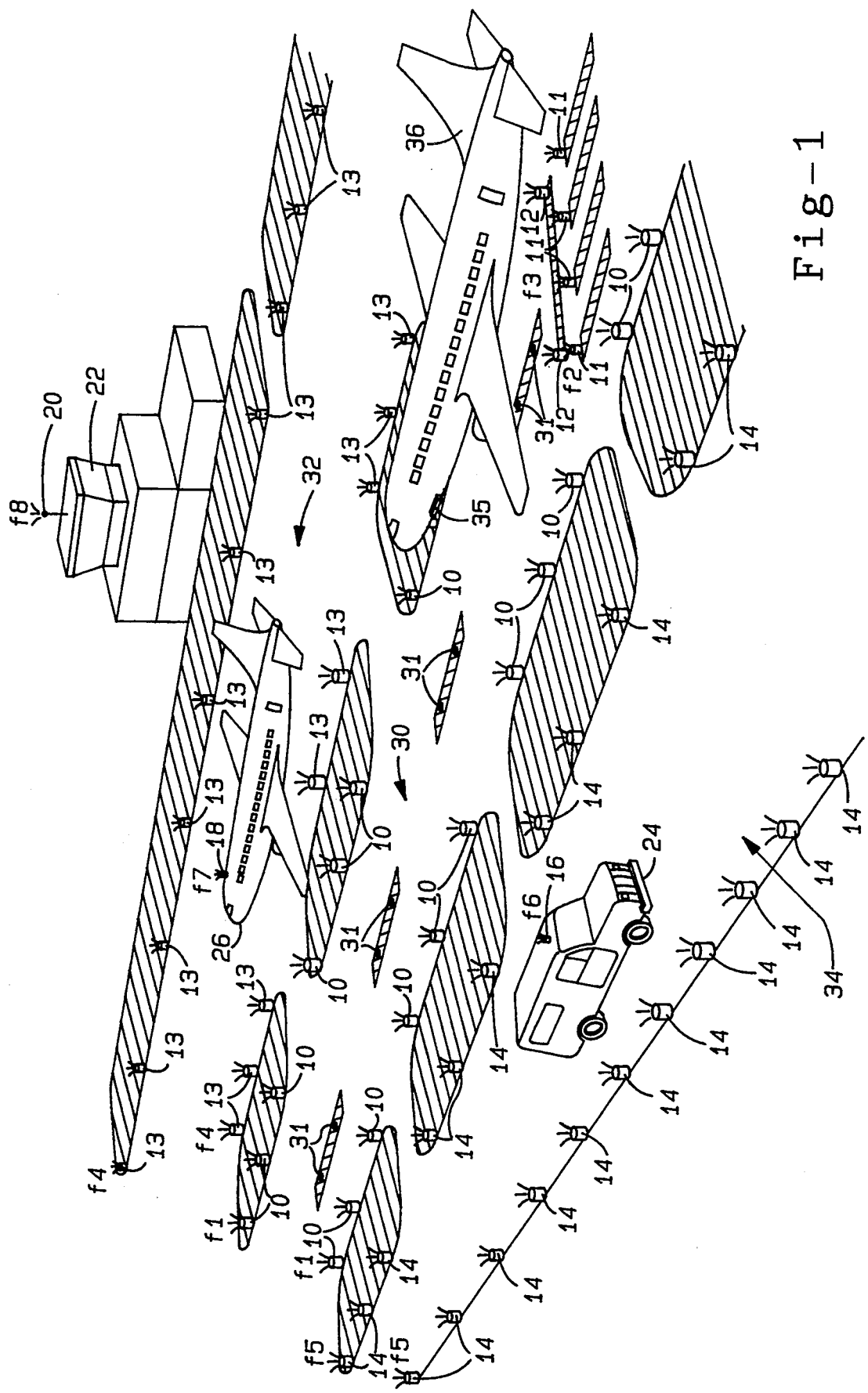
FIG. 1 is a pictorial representation of a microwave visualization system in accordance with the present invention.

Turning now to FIG. 1, a microwave/millimeter wave visualization system is shown therein for facilitating safe landing of an aircraft on a runway especially during low visibility conditions. The visualization system is described herein in connection with an aircraft landing system for locating known features on or near a runway. However, the millimeter wave visualization system may be used in connection with other types of locating applications such as aircraft location, ship navigation automotive collision warning and other kinds of navigation.

The visualization system includes a plurality of multi-frequency amplitude modulated (AM) microwave or millimeter wave power sources located on or near predetermined features to be located such as those found on or near a runway. The power sources radiate microwave or millimeter wave energy which is not substantially attenuated by atmospheric moisture, such as fog, snow or rain and other environmental conditions such as smoke or dust. The plurality of power sources emit microwave or millimeter wave carrier signals with amplitude modulations selected so as to identify selected features with selected modulated frequencies.

The plurality of microwave power sources may include a first set of microwave power sources 10 which are located along the sides of a main aircraft runway 30. The power sources 10 emit a first amplitude modulated microwave power signal which has a first amplitude modulated frequency $f_1$. Second and third sets of microwave power sources 11 and 12 are located at one end of the main runway 30. The power sources 11 and 12 emit second and third amplitude modulated microwave power signals which have second and third amplitude modulated frequencies $f_2$ and $f_3$, respectively.

A fourth set of microwave power sources 13 are positioned along the sides of a taxi-runway 32. The power sources 13 emit a fourth amplitude modulated microwave power signal which has a fourth amplitude modulated frequency $f_4$. A fifth set of microwave power sources 14 are likewise positioned along the sides of a service road 34 and emit a fifth amplitude modulated microwave signal which has a fifth amplitude modulated frequency $f_5$. Additional sets of microwave power sources may be employed as desired to identify other features of the runway, such as runway center line markings 31. The first, second, third, fourth and fifth power sources 10, 11, 12, 1.3 and 14 are located in ground beacons which are preferably mounted on or near runway, taxi or perimeter lights. The modulated frequencies for the power sources may be selected to emit radiation having a color that represents a particular color which corresponds to the visible light emitted from conventional associated runway lights.

The plurality of power sources may further include power sources appropriately located on or near other features which may be commonly found on or near the main runway 30. For instance, a service truck 24 may be equipped with a sixth amplitude modulated microwave power source 16 which has a sixth modulated frequency $f_6$. The sixth power source 16 emits a sixth amplitude modulated microwave power signal which has a sixth modulated frequency $f_6$. In addition, a seventh amplitude modulated microwave power source 18 may be located on other aircraft such as aircraft 26 found on taxi-runway 32. The seventh power source 18 emits a seventh amplitude modulated microwave power signal which has a seventh modulated frequency $f_7$. Furthermore, an eighth microwave power source 20 may be located on or near a control tower 22 for emitting a radiating microwave power signal which has an eighth modulated frequency $f_8$. Other objects or features may further be equipped with additional N sets of amplitude modulated microwave power sources for emitting microwave signals which generally provide identical modulated frequencies for identifying similar selected features while providing different modulated frequencies to distinguish between different selected features.

Figure 2:
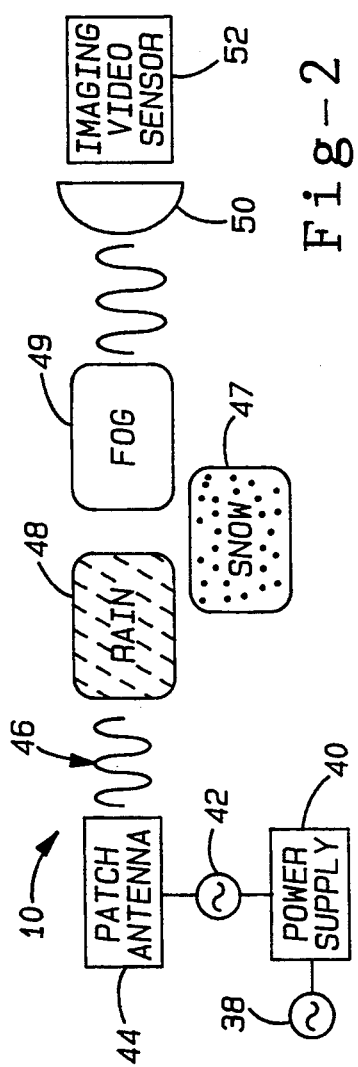
FIG. 2 is a block diagram which illustrates microwave or millimeter wave detection under conditions of poor visibility in accordance with the present invention.

An imaging video detection camera 35 is located on an aircraft 36 to facilitate the landing thereof, especially under conditions of low visibility. FIG. 2 illustrates the sensing of a microwave power signal 46 generated by an amplitude modulated microwave power source 10 under conditions of low visibility such as that created by the presence of rain 48, fog 49 or snow 47. The power source 10 is a conventional off-the-shelf power source which generally provides a signal of 20 – 150 milliwatts (13–22 dBrn) of power at 94 GHz. For purposes of this invention, it is generally required that the power supplied be of an amount adequate to be detected at distances of up to 4 kilometers under obscured weather conditions. Under rather bad weather conditions, one may generally assume average atmospheric transmission losses of around $1\frac{1}{2}$ dB/km. However, such losses may vary considerably considering typical transmission attenuation may include 4 dB/km for rain and 1 dB/km for fog.

The power source 10 is made up of a power supply 40 which receives a modulated signal from a signal modulator 38. The power supply 40 and signal modulator 38 generate an amplitude modulated signal. The power source provides an output to a microwave or millimeter wave signal oscillator 42. The signal oscillator 42 provides a 94 GHz carrier signal to the amplitude modulated signal so as to generate an amplitude modulated microwave power signal. The amplitude modulated power signal is then transmitted from a patch antenna 44 in the form of a radiating signal 46. The antenna 44 is preferably a 3 dB gain omni directional microstrip patch antenna which radiates signals throughout a large area.

The present invention employs a 94 GHz frequency microwave carrier signal which advantageously provides for minimal atmosphere attenuation and good physical ground resolution. However, other microwave or millimeter wave carrier signals generally within a bandwidth of 1 GHz to 300 GHz may likewise be employed without departing from the spirit of this invention. The present invention further provides amplitude modulated (AM) signals with modulating frequencies $f_1$ through $f_N$ which are assigned so as to designate the type of feature to be identified therewith. It is preferred that the modulating frequencies $f_1$ through $f_N$ are selected generally within a bandwidth of 10 KHz to 100 KHz, however other frequencies may be used without departing from this invention.

Figure 3:
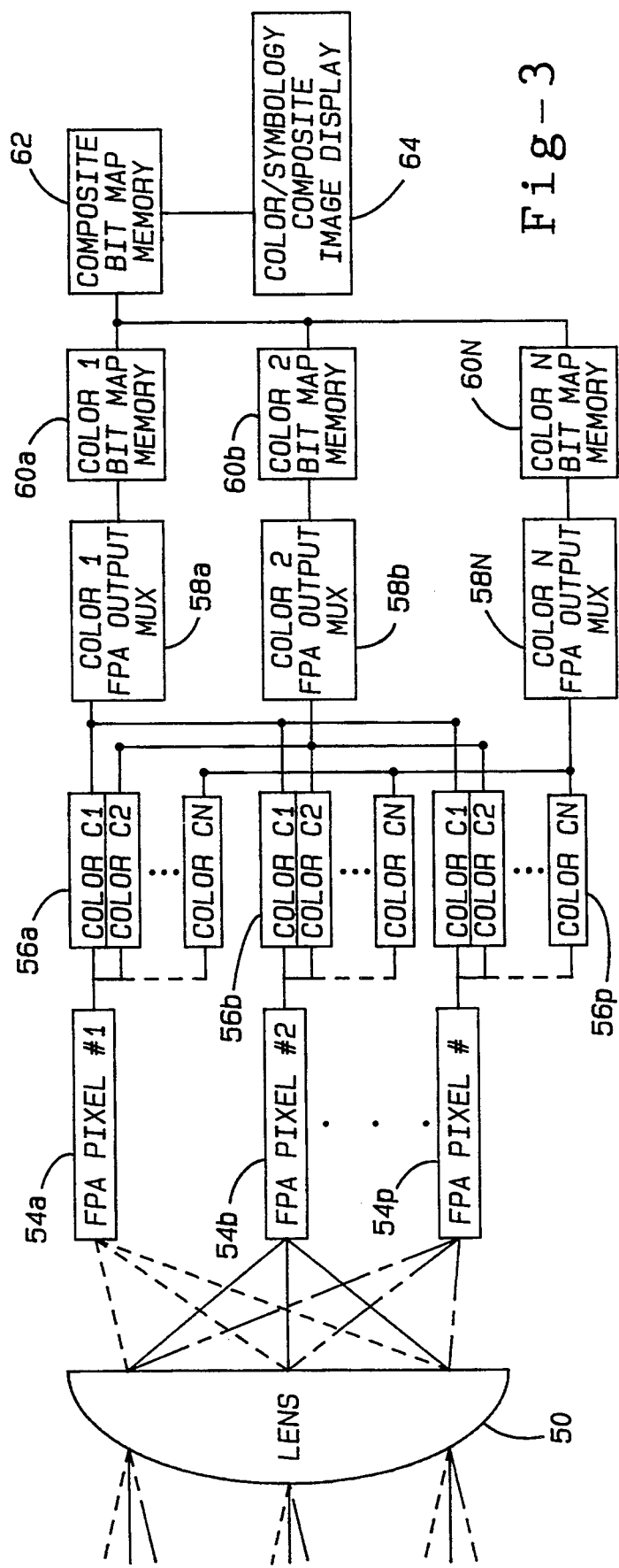
FIG. 3 is a block diagram which illustrates an imaging video detection camera according to the present invention.

The radiating signal 46 penetrates rain 48, fog 49, snow 47 or other visibility impairing conditions and is received by the imaging video detection camera 35. The camera 35 includes a microwave signal collecting optics lens 50 which is coupled to an imaging video sensor 52. The lens 50 and imaging video sensor 52 are further illustrated in FIG. 3. The lens 50 collects microwave or millimeter wave signals from a selected field of view and focuses the signals received onto a multi-element focal plane array (FPA). The focal plane array is made up of an array of focal plane receiver elements 54A through 54P. Each focal plane receiver element 54 receives signals from an array of the field of view and provides output signals to a pixel for a video display of the image. The field of view and pixel size are preferably selected to give a reasonably detailed image of the runway 30. In a preferred embodiment, a lens 50 with a 24 inch aperture and 100×100 pixels for a total of 10,000 may be employed.

Each of the focal plane array receiver elements 54A through 54P form a complete video signal detection and narrow bandwidth amplitude modulated frequency signal detection circuit as shown by the block diagram in FIG. 4. Each focal plane array receiver element 54 includes a taper slot antenna 66 which receives microwave or millimeter wave signals directed thereto. The received signals are transmitted through a 94 GHz band-pass filter 68. The bandpass filter 68 may be provided as part of the taper slot antenna 66 or separate therefrom. A diode detector 70 is connected to the output of the band-pass filter 68 for detecting and rectifying signals having a frequency of 300 KHz or higher so as to rectify the carrier signal while allowing lower frequencies such as the modulated frequencies $f_1$ through $f_N$ to pass therethrough. A low pass filter 72 is coupled to the output of the detector diode 70 for allowing rectified amplitude modulated signals to pass therethrough while filtering high frequency noise. Filter 72 generally filters signals which have a frequency of 300 kHz or higher. A low noise video amplifier 74 is connected to the output of the low pass filter 72 for amplifying signal to a desired amplitude.

The output of the amplifier 74 is connected to a phase sensitive detector (PSD) 76 which provides narrow bandwidth video detection while greatly enhancing the signal to noise ratio. The phase sensitive detector 76 is a very narrow band-pass video filter which operates within a narrow bandwidth as low as a few hertz. The phase sensitive detector 76 substantially eliminates noise and ambient signals in the frequency range that contains very little or none of the amplitude modulated signal power. As a result, the signal to noise ratio is improved and is large enough so that positive detection of the presence of microwave or millimeter wave signals may be effectively detected. While a phase sensitive detector 76 is used herein to provide a narrow band-pass video filter, it is conceivable that other devices such as a synchronous filter may be used without departing from the scope of the invention.

The phase sensitive detector 76 includes a mixer 78 which has a first input connected to the output of the amplifier 74 and a second input connected to a frequency tracking loop 79. The output of the mixer 78 is connected to a low frequency detector diode 80. The detector diode 80 detects and rectifies the amplitude modulated signals applied therethrough. The output of the detector diode 80 is connected to a low pass filter 82 which filters signals generally having frequencies of 300 KHz and lower to thereby enhance the signal to noise ratio. The low pass filter 82 is connected to a direct current (DC) amplifier 83. The output of the DC amplifier 83 is connected to a frequency tracking circuit 84 which is coupled to a voltage controlled oscillator 86 (VCO). The voltage controlled oscillator 86 further receives a voltage control signal 93 from a computer processor 92. The frequency tracking circuit 84 and voltage controlled oscillator 86 together form the frequency tracking loop 79.

The frequency tracking loop 79 provides compensation for amplitude modulated frequency drift. In a preferred embodiment, the amplitude modulated frequencies $f_1$ through $f_N$ are detected by a step variation of the frequency tracking loop 79 in the phase sensitive detector 76. In doing so, the computer processor 92 sequentially changes the voltage control signal 93 supplied to voltage controlled oscillator 86 which in turn changes the frequency of the frequency tracking loop 79. As a result, the phase sensitive detector 76 sequentially changes the detection bandwidth to detect signals within different narrow bandwidths, one at a time. This approach is most feasible when a small number of modulated frequencies are employed and increased integration time is unnecessary.

However, if a larger number of frequencies are employed and increased integration time is necessary, an alternate embodiment of the phase sensitive detector may be employed as shown in FIG. 5. The alternate embodiment of the phase sensitive detector 76' employs a plurality of phase sensitive detectors 76A' through 76N' arranged in parallel. The phase sensitive detectors 76A' through 76N' make up a bank of narrow band-pass filters which each receive a divided portion of the input signals. In doing so, each of the phase sensitive detectors 76A' through 76N' monitors and detects signals within separate narrow predetermined frequency bandwidths. It may be necessary to use a larger amplifier 74 in accordance with the alternate embodiment so that each phase sensitive detector receives an adequately amplified signal.

The output of the phase sensitive detector 76 is coupled to a comparator 88. The comparator 88 compares the detector signal with a threshold voltage $V_T$. The output of the comparator 88 provides a single bit output represented by a "0" or "1". The output of each focal plane receiver element 54A through 54P provides a single bit output for each of the modulated frequencies $f_1$ through $f_N$ as illustrated by color coding $C_1$ through $C_N$ labeled 56A through 56P.

Figure 6:
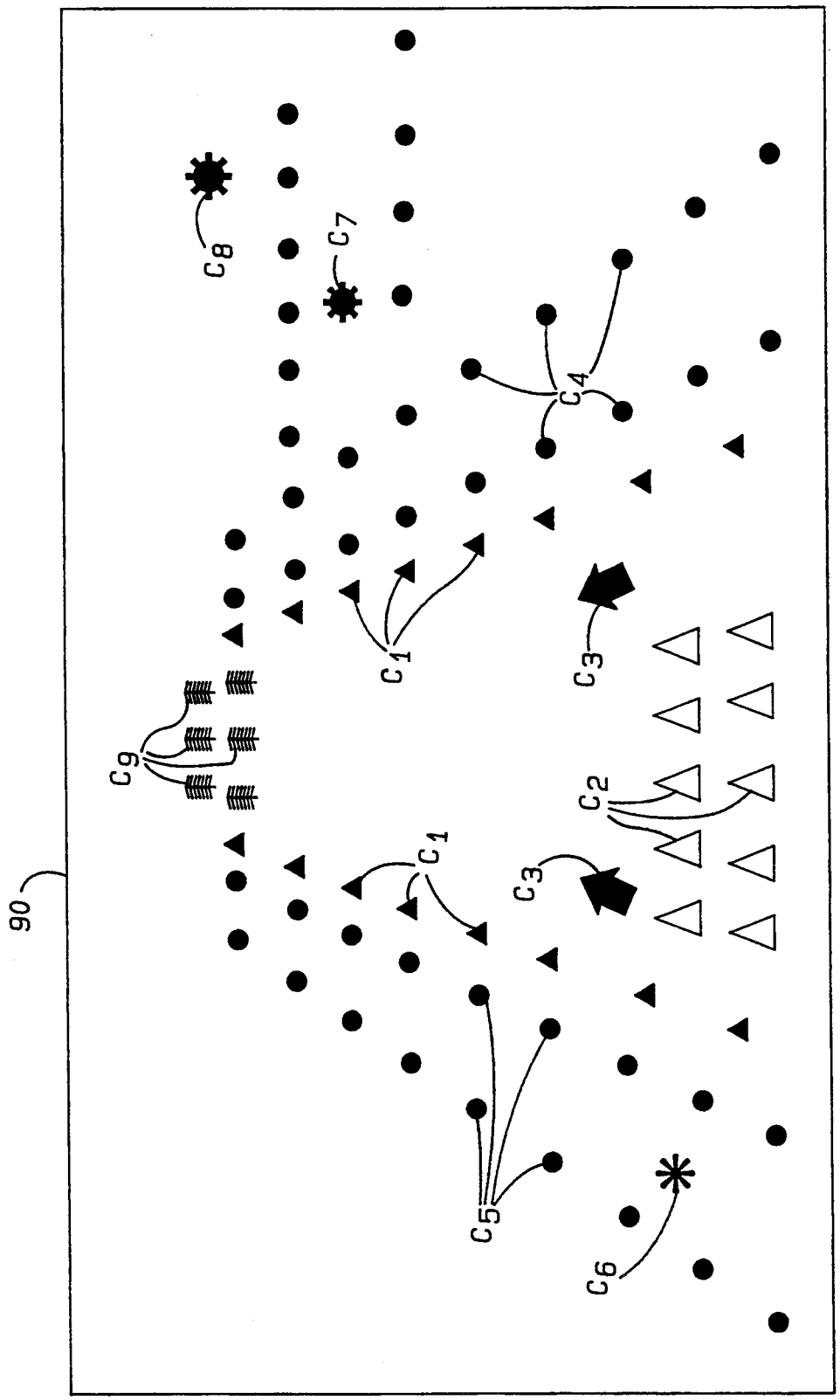
FIG. 6 is a pictorial representation of a typical composite image display seen by a pilot of an aircraft approaching a runway.

The bit outputs are provided to an array of multiplexers 58A through 58N. Each of multiplexers 58A through 58N receives binary bits for each of the modulated frequencies $f_1$ through $f_N$ and loads the binary data into separate bit map memories 60A through 60N. The bit map memories 60A through 60N are coupled to a composite bit map memory 62 which maps and stores the binary data collectively and provides the mapped data to a color/symbology composite image display 64. The image display 64 displays the mapped data by representing each map with a different color and/or symbol so that features having different modulated frequencies $f_1$ through $f_N$ are distinguished one from the other. An example of such a display is shown in FIG. 6 in which detailed features with modulated frequencies $f_1$ through $f_N$ are illustrated by selected color and/or symbolic coding $C_1$ through $C_N$.

In operation, the plurality of amplitude modulated microwave power sources are located on predetermined selected features to be located such as an airport runway and features commonly associated therewith. The imaging video detection camera 35 is mounted to a surface remote from said power sources such as the body of an aircraft 36 and is positioned so as to collect microwave signals generated by the power sources. As the aircraft 36 approaches the runway, the camera 35 detects the microwave signals via lens 50. In so doing, the lens 50 collects microwave signals from a field of view and focuses the collected signals onto an array of focal plane receiver elements 54A through 54P.

Each of the focal plane receiver elements 54A through 54P receives and analyzes microwave signals collected from a portion of the field of view. In doing so, phase sensitive detectors 76 provide narrow bandwidth filtering which operate to identify each of the modulated frequencies with one of a plurality of narrow frequency bandwidths. As a result, the focal plane receiver elements 54A through 54P are able to detect predetermined objects or features associated with the plurality of modulated frequencies $f_1$ through $f_N$.

Each of the focal plane receiver elements 54A through 54P generate a single bit output for each of the modulated frequencies $f_1$ through $f_N$ which are stored in corresponding bit map memories 60A through 60N. A composite bit map memory 62 maps the data and provides the mapped data to a color and/or symbology composite image display 64. As a result, the pilot of the aircraft is able to distinguish frequencies of one modulated frequency from those of other selected frequencies in accordance with the symbols and/or color coding $C_1$ through $C_N$ as provided by display 64.

Under rather typical severe low visibility conditions, the present visualization system may generally be employed to adequately locate an aircraft runway and other selected features at a range of at least 4 kilometers. Under such conditions, the visualization system may provide a good signal-to-noise ratio of around 10 dB or higher.

While the present invention has been described in connection with the aforementioned aircraft landing system, the invention may be used for other types of locating and/or collision avoidance systems. For instance, a water navigation system may be provided for locating waterway markings and ships under low visibility conditions. The same concept may be employed for air-to-air or ground-to-air locating of aircraft.

In view of the foregoing, it can be appreciated that the present invention enables the user to achieve a multi-frequency amplitude modulated microwave/millimeter wave visualization system. Thus, while this invention has been disclosed herein in connection with a particular example thereof, no limitation is intended thereby except as defined by the following claims. That is because a skilled practitioner will recognize that other modifications can be made without departing from the spirit of this invention after studying the specification and drawings.

What is claimed is:

1. A locating system comprising:
   source means located on known features and radiating modulated microwave carrier signals having predetermined modulated frequencies selected so as to identify each of said known features; and
   camera means remote from said source means for sensing said microwave carrier signals within a field of view and providing a visual perspective image of said known features, said camera means including:
   an array of receivers arranged in a focal plane for sensing said microwave carrier signals from separate portions of said field of view;
   bandwidth filter means coupled to each of said array of receivers for identifying the modulated frequency associated with each received microwave carrier signal as one of the predetermined modulated frequencies and providing an output signal to identify each detected known feature; and
   a visual display for generating said visual perspective image of the detected known features in response to said output signals and which distinguishes between each of said detected known features, wherein said visual display includes a plurality of pixels, and each of said pixels receives output signals generated by one of said receivers and the bandwidth filter means coupled thereto.

2. The locating system as defined in claim 1 wherein said camera means further comprises:
   focusing means operatively coupled to said array of receivers and aligned with the focal plane for collectively focusing said microwave carrier signals from the field of view onto the array of receivers.

3. The locating system as defined in claim 2 wherein each of said array of receivers comprises:
   antenna means operatively coupled to said focusing means for receiving said radiating microwave carrier signals from said portion of the field of view.

4. The locating system as defined in claim 1 wherein said narrow bandwidth filter means comprises:
   at least one narrow passband filter; and
   means for sequentially selecting the passband frequency of said passband so as to continuously monitor a number of selected frequency bandwidths.

5. The locating system as defined in claim 1 wherein said narrow bandwidth filter means comprises a plurality of passband filters connected in parallel, each of said plurality of passband filters monitoring a selected narrow frequency bandwidth.

6. The locating system as defined in claim 1 further comprising:
   memory means for storing the output signals in a bit map.

7. The locating system as defined in claim 1 wherein said source means comprises:
   a plurality of modulated sources for radiating modulated microwave power signals; and wherein,
   each of said plurality of modulated sources are located on a selected known feature and has a predetermined amplitude modulated frequency which identifies said feature.

8. The system as defined in claim 1 wherein said source means are located relative to a runway and selected features associated therewith and said camera means are located on an aircraft so as to provide a visual aid for an aircraft landing system.

9. A visualization system for use on an aircraft to identify features associated with an aircraft runway, said system comprising:
   a plurality of signal sources located on selected known features associated with an aircraft runway and radiating modulated microwave carrier signals which have modulated frequencies selected so as to identify said known features;
   receiver means located on an aircraft and including an array of receiver elements arranged in a focal plane for sensing said microwave carrier signals within a selected field of view, each of said receiver elements receiving microwave carrier signals from separate portions of said field of view;
   filtering means coupled to each of said receiver elements for identifying the modulated frequency associated with each received microwave carrier signal as one of said predetermined modulated frequencies and providing an output signal to identify each detected known feature; and
   imaging means including a plurality of pixels operatively connected to said receiver means for creating a visual perspective image of the detected known features in response to the output signals and which identifies and distinguishes between said detected known features, wherein each of said pixels receives output signals generated by one of said receiver means and the filtering means coupled thereto.

10. The visualization system as defined in claim 9 wherein said receiver means further comprises:
focusing means including a microwave lens for receiving the microwave signals within said field of view and focusing said received signals onto the array of receiver elements.

11. The visualization system as defined in claim 9 wherein each of said receiver elements comprises:
antenna means operatively coupled to said focusing means for receiving said radiating microwave carrier signals from said portion of said field of view.

12. The visualization system as defined in claim 9 wherein said filtering means comprises at least one narrow bandpass filter for sensing said modulated frequencies of said radiating signals within selected frequency bandwidths.

13. The visualization system as defined in claim 9 wherein said filtering means comprises:
at lest one narrow bandpass filter; and
means for sequentially selecting a plurality of frequency bandwidths for said passband filter so as to continually monitor a number of selected frequency bandwidths.

14. The visualization system as defined in claim 9 wherein said filtering means comprises a plurality of passband filters located in parallel, each of said plurality of passband filters monitoring a selected narrow bandwidth for detecting microwave signals having one of said modulated frequencies.

15. The visualization system as defined in claim 9 further comprising:
memory means for storing the output signals in a bit map.

16. A method for locating selected known features and producing a visual image thereof, comprising:
placing power sources on selected known features for producing microwave carrier signals having modulating frequencies;
selecting said modulating frequencies in accordance with the selected known features so that different features have different modulating frequencies;
sensing said microwave carrier signals within a field of view via an array of receivers at a location remote from said power sources so that each receiver senses microwave signals from a separate portion of said field of view;
filtering said sensed microwave carrier signals to identify said modulating frequencies associated therewith so as to identify said known features;
providing an output signal for each sensed microwave carrier signal which indicates location and identity of said known feature associated therewith; and
generating a visual perspective image of detected known features with a plurality of pixels in response to said output signals, wherein each of said pixels receives output signals generated by one of said receivers.

17. The method as defined in claim 16 wherein the step of filtering comprises comparing said sensed microwave signals with narrow bandwidth filters so as to identify said modulating frequencies as one of a plurality of selected frequencies.

18. The method as defined in claim 16 further comprising the steps of:
storing the output signals in a bit map; and
displaying the stored output signals in a visual display.

19. The method as defined in claim 16 wherein said step of sensing said microwave signals comprises:
focusing microwave signals received from a field of view onto the array of receivers along a focal plane.

* * * * *